United States Patent
Miyoshi et al.

(10) Patent No.: US 8,126,073 B2
(45) Date of Patent: *Feb. 28, 2012

(54) RADIO TRANSMISSION DEVICE, RADIO RECEPTION DEVICE, RADIO TRANSMISSION METHOD, AND RADIO RECEPTION METHOD

(75) Inventors: Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,450

(22) Filed: May 19, 2010

(65) Prior Publication Data

US 2010/0297969 A1 Nov. 25, 2010

Related U.S. Application Data

(63) Continuation of application No. 11/573,072, filed as application No. PCT/JP2005/012356 on Jul. 4, 2005, now Pat. No. 7,760,811.

(30) Foreign Application Priority Data

Aug. 5, 2004 (JP) ................................ 2004-229733

(51) Int. Cl.
*H04K 1/10* (2006.01)
*H04J 11/00* (2006.01)
(52) U.S. Cl. ...................................... 375/260; 370/210
(58) Field of Classification Search .................. 375/260, 375/262, 265, 267; 370/208, 210
See application file for complete search history.

(56) References Cited

U.S. PATENT DOCUMENTS

| 6,345,036 | B1 | 2/2002 | Sudo | |
|---|---|---|---|---|
| 7,170,342 | B2 * | 1/2007 | Suzuki et al. | 330/149 |
| 2001/0033614 | A1 | 10/2001 | Hudson | |
| 2002/0037058 | A1 | 3/2002 | Birru | |
| 2002/0079965 | A1 * | 6/2002 | Maniwa et al. | 330/149 |
| 2003/0076908 | A1 | 4/2003 | Huang | |
| 2004/0009783 | A1 | 1/2004 | Miyoshi | |
| 2004/0127245 | A1 * | 7/2004 | Sadri et al. | 455/522 |
| 2004/0170228 | A1 * | 9/2004 | Vadde | 375/260 |
| 2005/0175112 | A1 | 8/2005 | Pisoni | |
| 2005/0180519 | A1 * | 8/2005 | Betts | 375/260 |
| 2005/0259565 | A1 * | 11/2005 | Fujii et al. | 370/203 |

(Continued)

FOREIGN PATENT DOCUMENTS

CN 1367615 9/2002

(Continued)

OTHER PUBLICATIONS

Chinese Office Action dated Jul. 10, 2009.

(Continued)

*Primary Examiner* — Young T. Tse
(74) *Attorney, Agent, or Firm* — Dickinson Wright PLLC (57) ABSTRACT

A radio transmission device capable of improving the reception error rate characteristics of a receiver. In this device, an FFT (Fast Fourier Transform) unit (102) subjects a transmission signal to an FFT operation, in which a signal in a time domain is converted into a signal in a frequency domain. A control unit (103) controls the transmission power of the FFT-operated transmission signal in the frequency domain. An IFFT (Inverse Fast Fourier Transform) unit (104) subjects the transmission signal having its transmission power controlled, to an IFFT operation, in which an inverse conversion is made into a signal in the time domain. A transmission RF unit (106) transmits the IFFT-operated transmission signal on a single carrier.

12 Claims, 5 Drawing Sheets

U.S. PATENT DOCUMENTS

| | | | |
|---|---|---|---|
| 2005/0259767 A1 | 11/2005 | Garmany | |
| 2006/0067207 A1* | 3/2006 | Miyoshi | 370/210 |
| 2006/0267812 A1 | 11/2006 | Bunin | |
| 2006/0281422 A1 | 12/2006 | Pan | |
| 2007/0189199 A1 | 8/2007 | Nishio | |
| 2008/0304582 A1 | 12/2008 | Miyoshi | |

FOREIGN PATENT DOCUMENTS

| | | |
|---|---|---|
| JP | 2000-101483 | 4/2000 |
| JP | 2000-332723 | 11/2000 |

OTHER PUBLICATIONS

PCT international Search Report dated Sep. 20, 2005.

H. Kobayashi, et al., "Tekio Hencho o Mochiita Single Carrier OFDM Tsushin Hoshiki" ("Single Carrier OFDM Technique with Adaptive Modulation Method"), The Transactions of the Institute of Electronics, Information and Communication Engineers, vol. J86-A. No. 12, Dec. 1, 2003, pp. 1329-1339.

D. Falconer, et al., "Frequency Domain Equalization for Single-Carrier Broadband Wireless Systems," IEEE Communications Magazine, Apr. 2002, pp. 58-66.

H. Gacanin, et al., "Shuhasu Ryoiki Toka o Mochiiru Ippanka OFDM" ("Generalized OFDM with Frequency-domain Equalization"), The Institute of Electronics, Information and Communication Engineers, Gijutsu Kenkyu Hokoku MW2003-252, Mar. 3, 2004, pp. 19-24.

* cited by examiner

RADIO TRANSMISSION DEVICE, RADIO RECEPTION DEVICE, RADIO TRANSMISSION METHOD, AND RADIO RECEPTION METHOD

This is a continuation application of application Ser. No. 11/573,072 filed Feb. 1, 2007, which issued on Jul. 20, 2010, as U.S. Pat. No. 7,760,811 and which is a national stage of PCT/JP2005/012356 filed Jul. 4, 2005, which is based on Japanese Application No. 2004-229733 filed Aug. 5, 2004, the entire contents of each of which are incorporated by reference herein.

TECHNICAL FIELD

The present invention relates to a radio transmission apparatus, radio reception apparatus, radio transmission method and radio reception method, and, more particularly, to a radio transmission apparatus, radio reception apparatus, radio transmission method and radio reception method for use in single carrier transmission systems with frequency domain equalization.

BACKGROUND ART

Single carrier transmission systems with frequency domain equalization have been studied, in recent years, for use in next-generation mobile communication systems. In single carrier transmission systems with frequency domain equalization, data symbols arranged in the time domain is transmitted on single carriers. A receiver executes frequency domain equalization processing to equalize, in a frequency domain, distortions of a signal on a transmission path. By the frequency domain equalization processing, these distortions are corrected. More specifically, a channel estimation value is calculated for each frequency in the frequency domain and weight is assigned to equalize distortions of the propagation path for each frequency. Then, received data is demodulated (see Non-Patent Document 1, for instance).

Non-patent Document 1: "Frequency Domain Equalization for single-Carrier Broadband Wireless Systems", IEEE Communications Magazine, April 2002, pp. 58-66.

DISCLOSURE OF INVENTION

Problems to be Solved by the Invention

However, in the conventional single carrier transmission system with frequency domain equalization as described above, there are cases where reception power for any of the frequencies within the bandwidth in use may drop drastically as compared to transmission power, due to the influence of the propagation path having characteristics that vary for each frequency. In this case, the transmission power allocated to the transmitted signal is wasted by the amount of such drop. For this reason, there is a certain limit to improving reception error rate characteristics of the receiver.

It is therefore an object of the present invention to provide a radio transmission apparatus, radio reception apparatus, radio transmission method and radio reception method capable of improving reception error rate characteristics of a receiver.

Means for Solving the Problem

In accordance with one aspect of the present invention, a radio transmission apparatus employs a configuration having: a conversion section that converts a signal in a time domain to a signal in a frequency domain; a control section that controls a transmission power of the converted signal in the frequency domain; an inverse conversion section that inversely converts the transmission power controlled signal to a signal in the time domain; and a transmission section that transmits the inversely converted signal on a single carrier.

In accordance with one aspect of the present invention, a radio reception apparatus employs a configuration having: a conversion section that converts a signal in a time domain transmitted on a single carrier to a signal in a frequency domain; a determining section that determines an algorithm for frequency domain equalization processing to which the converted signal is to be subjected; a generation section that generates frequency domain equalization algorithm information showing the determined algorithm; and a transmission section that transmits the generated frequency domain equalization algorithm information to a radio transmission apparatus.

In accordance with one aspect of the present invention, a radio transmission method includes:
a conversion step of converting a signal in a time domain to a signal in a frequency domain; a control step of controlling a transmission power of the converted signal in the frequency domain; an inverse conversion step of inversely converting the signal with the transmission power controlled to the signal in the time domain; and a transmission step of transmitting the inversely converted signal on a single carrier.

In accordance with one aspect of the present invention, a radio reception method includes: a conversion step of converting a signal in a time domain transmitted on a single carrier, to a signal in a frequency domain; a determination step of determining an algorithm for frequency domain equalization processing to which the converted signal is to be subjected; a generation step of generating frequency domain equalization algorithm information showing the determined algorithm; and a transmission step of transmitting the generated frequency domain equalization algorithm information to a radio transmission apparatus.

Advantageous Effect of the Invention

The present invention improves reception error rate characteristics of a receiver.

BEST MODE FOR CARRYING OUT THE INVENTION

Now, embodiments of the present invention will be described in detail with reference to the accompanying drawings.

(Embodiment 1)

Figure 1:
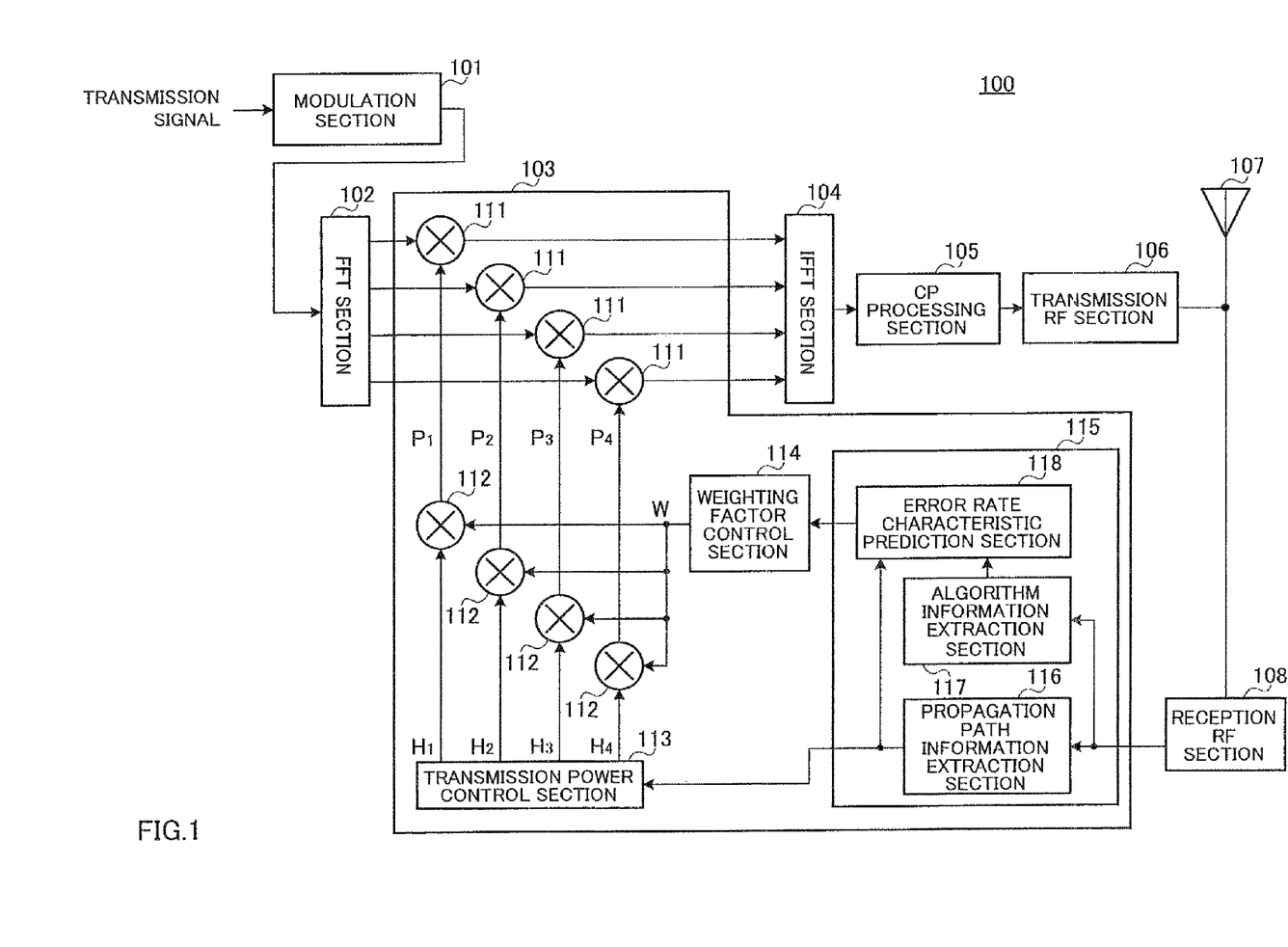
FIG. 1 is a block diagram showing a configuration of a radio transmission apparatus according to embodiment 1 of the present invention.
Figure 2:
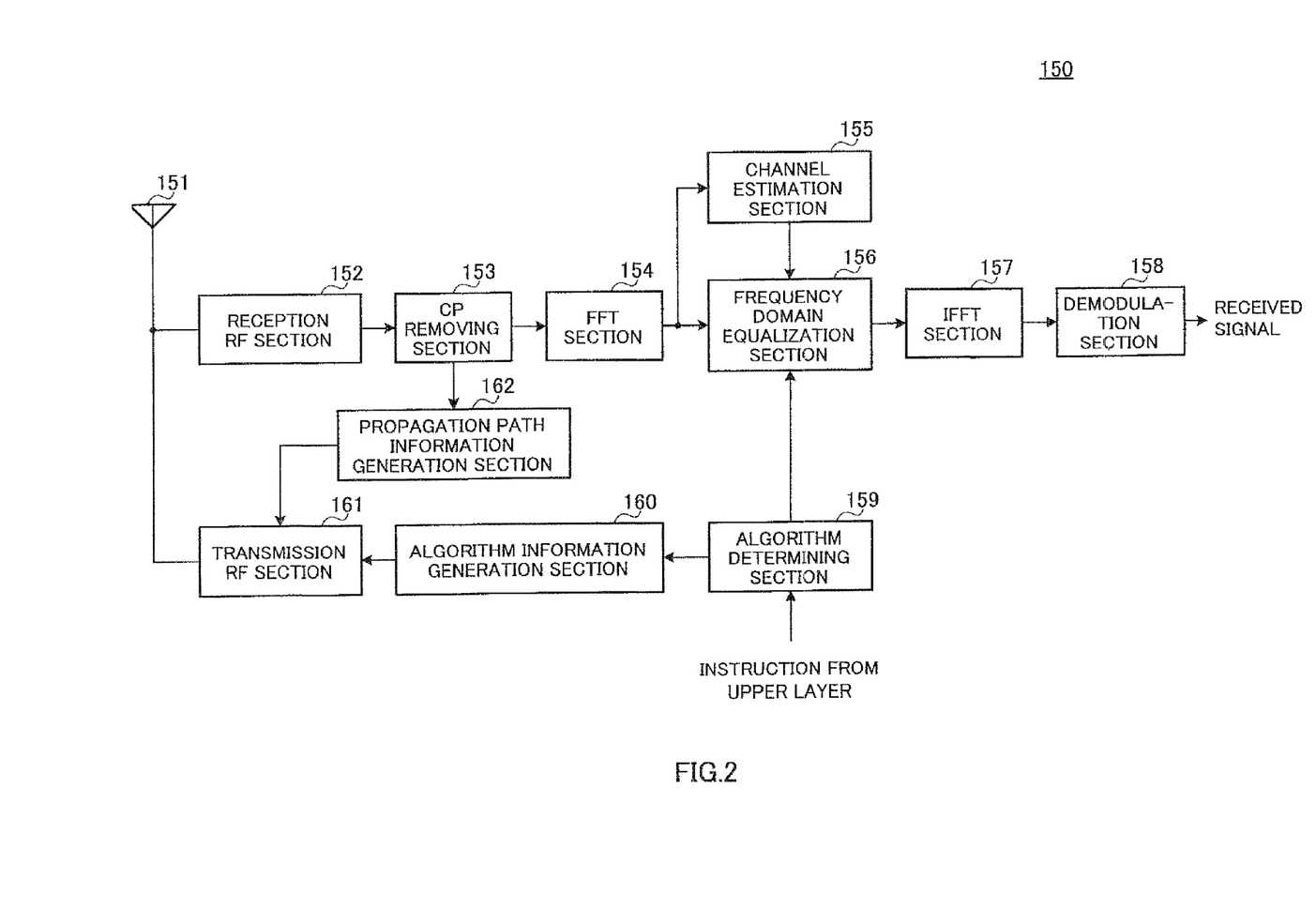
FIG. 2 is a block diagram showing a configuration of a radio reception apparatus according to embodiment 1 of the present invention.

FIG. 1 is a block diagram showing a configuration of a radio transmission apparatus according to embodiment 1 of the present invention. FIG. 2 is a block diagram showing a configuration of a radio reception apparatus that carries out radio communication with radio transmission apparatus 100 of FIG. 1.

The present invention can be applied to mobile communication systems where a plurality of frequencies are included in the single-carrier band in use. However, in the present embodiment and the subsequent embodiments, the number of frequencies included in the band is assumed to be four, for ease of explanation. Also, in the present embodiment and the subsequent embodiments, each frequency (or each frequency band) within the single-carrier band in use can be used as a virtual subcarrier in the communication band. Further, it can also be used as a sub-band obtained by segmenting the communication band.

Radio transmission apparatus 100 has: modulation section 101 that modulates a transmission signal; FFT section 102 that subjects the modulated transmission signal to FFT (Fast Fourier Transform) processing, in which a signal in a time domain is converted to a signal in a frequency domain; control section 103 that controls, in a frequency domain, a transmission power of the FFT-processed transmission signal; IFFT section 104 that subjects the transmission signal, having its transmission power controlled, to IFFT (Inverse Fast Fourier Transform) processing, in which the signal in the frequency domain is inversely converted to a signal in the time domain; CP processing section 105 that adds a CP (Cyclic Prefix) to the IFFT-processed transmission signal, at a predetermined position thereof; transmission RF section 106 that subjects the transmission signal with the CP added thereto, to predetermined transmission radio processing including D/A conversion, up-conversion, and the like, and transmits the transmission signal subjected to the transmission radio processing, on a single carrier, via antenna 107; and reception RF section 108 that receives the radio signal via antenna 107 and subjects the received radio signal to predetermined reception radio processing including down-conversion, D/A conversion and the like.

Also, control section 103 has multiplication sections 111 and 112, transmission power control section 113, weighting factor control section 114 and weighting factor deriving section 115. Weighting factor deriving section 115 has propagation path information extraction section 116, algorithm information extraction section 117 and error rate characteristic prediction section 118.

In weighting factor deriving section 115, algorithm information extraction section 117 extracts frequency domain equalization algorithm information (described later), from the signal that has been subjected to the reception radio processing (hereinafter referred to as "received signal"). Propagation path information extraction section 116 extracts, from the received signal, propagation path information (described later). Error rate characteristic prediction section 118 predicts the reception error rate characteristic of radio reception apparatus 150 in the case where the signal, with its transmission power controlled, is transmitted, in accordance with the extracted frequency domain equalization algorithm information and propagation path information, and derives a weighting factor for weighting the transmission power control, by using the results of the prediction.

The extracted propagation path information and the derived weighting factor are respectively controlled by transmission power control section 113 and weighting factor control section 114, and are multiplied by each other at multiplication section 112. The transmission power of the FFT-processed transmission signal is corrected by multiplication section 111, for each frequency, so as to take a value obtained as a result of the multiplication by multiplication section 112.

Radio reception apparatus 150 shown in FIG. 2 has antenna 151, reception RF section 152, CP removing section 153, FFT section 154, channel estimation section 155, frequency domain equalization section 156, IFFT section 157, demodulation section 158, algorithm determining section 159, algorithm information generation section 160, transmission RF section 161 and propagation path information generation section 162.

Reception RF section 152 receives the radio signal via antenna 151 and subjects this signal to a predetermined reception radio processing including down-conversion, A/D conversion and the like. CP removing section 153 removes the CP that has been added to a predetermined position of the received signal. FFT section 154 subjects the received signal, having its CP removed, to an FFT processing in which the signal in a time domain is converted to a signal in a frequency domain. Channel estimation section 155 executes channel estimation using a pilot signal from among the FFT-processed received signals.

Algorithm determining section 159 determines an algorithm of the frequency domain equalization processing in accordance with an instruction from an upper layer and reports the determined algorithm to frequency domain equalization section 156 and algorithm information generation section 160. The MMSE (Minimum Mean Square Error) scheme, the MRC (Maximal Rate Combining) scheme, the ORC (Orthogonality Restoring Combining) scheme, the EGC (Equal Gain Combining) scheme and the like, for example, are given as algorithms for the frequency domain equalization processing.

Frequency domain equalization section 156 subjects the FFT-processed received signal to frequency domain equalization processing, in accordance with the reported algorithm and using the channel estimation result.

IFFT section 157 subjects the frequency domain equalization-processed received signal to IFFT processing in which the signal in the frequency domain is inversely converted to a signal in the time domain. Demodulation section 158 demodulates the IFFT-processed received signal.

Algorithm information generation section 160 generates frequency domain equalization algorithm information that shows the determined algorithm and which reports the determined algorithm to radio transmission apparatus 100. Propagation path information generation section 162 generates, from the received signal having its CP removed, propagation path information for reporting the power gain for each frequency on the propagation path to radio transmission apparatus 100.

Transmission RF section 161 subjects the generated frequency domain equalization algorithm information and the propagation path information to predetermined transmission radio processing including D/A conversion, up-conversion and the like, and transmits the frequency domain equalization algorithm information and the propagation path information which have been subjected to the transmission radio processing, to radio transmission apparatus 100, via antenna 151.

Figure 3:
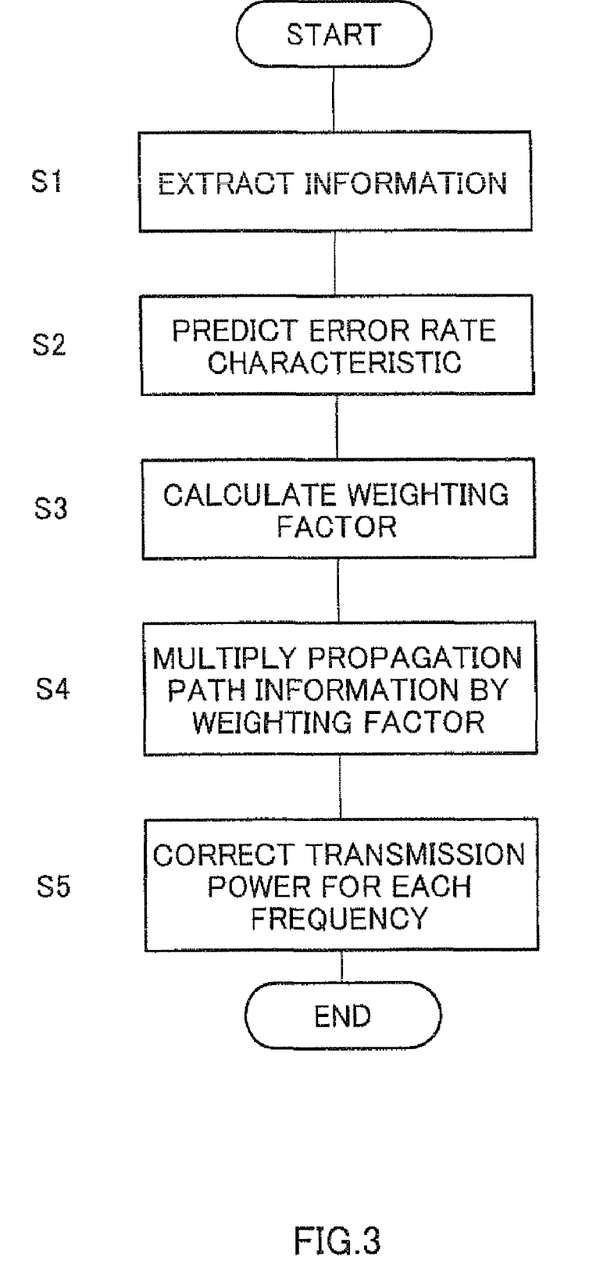
FIG. 3 is a flowchart for explaining the operations of a control section in a radio transmission apparatus according to embodiment 1 of the present invention.

Next, the transmission power control operation in control section 103 of radio transmission apparatus 100 will be explained. FIG. 3 is a flowchart for explaining the operation of control section 103.

First, in step S1, propagation path information extraction section 116 extracts the propagation path information from the received signal. Here, the propagation path information is shown by Hk (k is the frequency number) as a scalar value. Also, algorithm information extraction section 117 extracts the frequency domain equalization algorithm information from the received signal.

Next, in step 2, error rate characteristic prediction section 118 predicts the error rate characteristic of radio reception apparatus 150 at the time a transmission signal having its transmission power controlled, is transmitted. As a result of this prediction, a function that shows the predicted reception error rate ER is acquired. In other words, if the weighting factor is shown by W as a scalar value, the predicted reception error rate ER is expressed by the following equation (1).

$$ER = f(W) \tag{1}$$

Thus, since the function f(W) which is the base for deriving the weighting factor W for use is acquired in accordance with the frequency domain equalization algorithm information transmitted from radio reception apparatus 150, it is possible to derive a weighting factor W using a function that is most suitable for the algorithm shown in the frequency domain equalization algorithm information.

Figure 4:
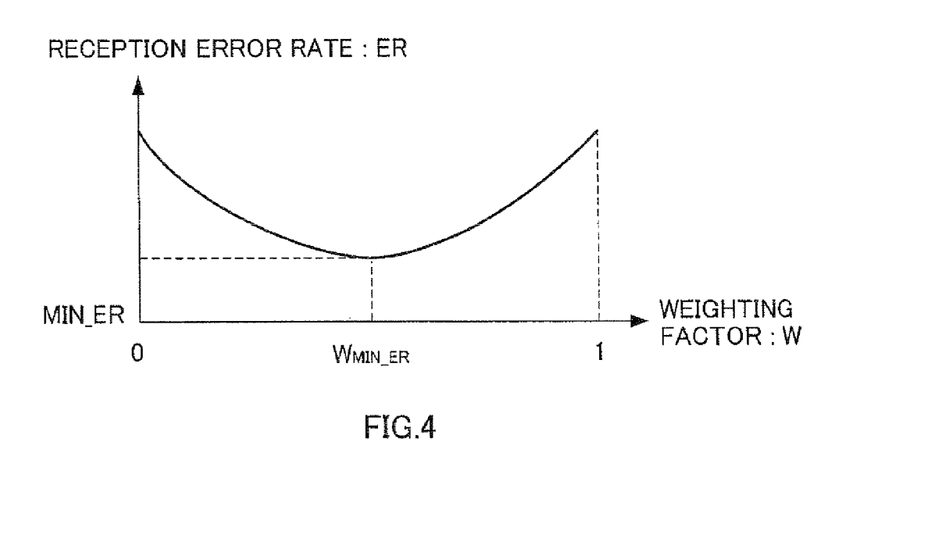
FIG. 4 is a diagram for explaining a coefficient calculation processing according to embodiment 1 of the present invention.

Next, in step S3, error rate characteristic prediction section 118 calculates the weighting factor W for use in transmission power control, by means of the above equation (1). In other words, a predetermined optimization technique is applied to function f(W) of equation (1) to calculate a weighting factor $W_{MIN\_ER}$ for optimizing the reception error rate ER. More specifically, a weighting factor $W_{MIN\_ER}$ that makes the reception error rate ER a minimum value MIN_ER, is calculated, as shown in FIG. 4. In other words, in this case, the weighting factor $W_{MIN\_ER}$ is calculated by the operation of W=argmin(f(W)).

Figure 5A:
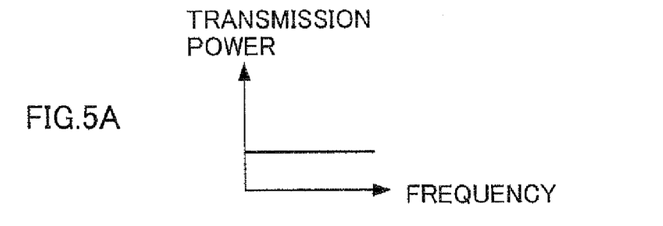
FIG. 5A is a diagram showing one example of weighting in transmission power control according to embodiment 1 of the present invention.
Figure 5B:
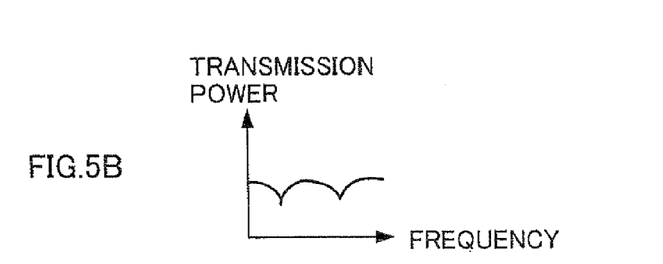
FIG. 5B is a diagram showing another example of weighting in transmission power control according to embodiment 1 of the present invention.
Figure 5C:
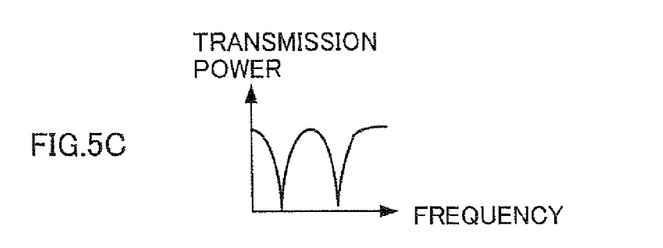
FIG. 5C is a diagram showing yet another example of weighting in transmission power control according to embodiment 1 of the present invention.

Here, FIG. 4 shows one example of the function f(W). If, for instance, the weighting coefficient W of the illustrated function f(W) is set to W=0, the transmission power of the transmission signal is not at all controlled in the frequency domain, as shown in FIG. 5A. Also, if, for instance, the weighting factor W is set to a suitable value in the range 0<W<1, the transmission power of the transmission signal is controlled by a value lower than the gain of the signal on the propagation path, as shown in FIG. 5B, and thus, the predicted reception error rate ER decreases as compared to the case where the transmission power control is not carried out. Further, if, for instance, the weighting factor W is set to W=1, the transmission power of the transmission signal is controlled by the same value as the gain of the signal on the propagation path, as shown in FIG. 5C. In other words, maximum ratio transmission is carried out. The reception error rate ER predicted in this case rises as compared to the case where the weighting factor W is set to a suitable value in the range of 0<W<1.

Next, the calculated weighting factor $W_{MIN\_ER}$ is reported to weighting factor control section 114. Weighting factor control section 114 controls the reported weighting factor $W_{MIN\_ER}$ and outputs it to multiplication section 112. Also, propagation path information Hk extracted in step S1 is reported to transmission power control section 113. Transmission power control section 113 controls the propagation path information Hk and outputs it to multiplication section 112.

Next, in step S4, multiplication section 112 multiplies the propagation path information Hk by the weighting factor $W_{MIN\_ER}$. By this multiplication, the transmission power control is weighted. Also, as result of the multiplication, a transmission power Pk associated with each frequency within the band in use is obtained, as shown in the following equation (2).

$$Pk = W_{MIN\_ER} \times Hk \tag{2}$$

In step S5, multiplication section 112 corrects the transmission power of the transmission signal in the frequency domain by means of the transmission power Pk.

According to the present embodiment, in radio transmission apparatus 100, the signal in a time domain, transmitted on a single carrier, is converted to a signal in a frequency domain, and its transmission power is controlled in a frequency domain, so that the transmission power allocated to the signal to be transmitted on a single carrier can be effectively used, and the reception error rate of radio reception apparatus 150 can be improved.

Also, according to the present embodiment, since in radio reception apparatus 150, information showing a determined frequency domain equalization algorithm is generated and transmitted, it is possible to report the frequency domain equalization algorithm to radio transmission apparatus 100, and radio transmission apparatus 100, which derives the weighting factor W from the function f(W), can acquire a function f(W) that is most suitable for this algorithm, and, as a result, the reception error rate characteristic can be improved. In other words, it is possible to improve the reception error rate characteristic by only adding a simple configuration for reporting the frequency domain equalization algorithm to radio transmission apparatus 100, and without adding any particular configuration to the reception system (reception RF section 152, CP removing section 153, FFT section 154, channel estimation section 155, frequency domain equalization section 156, IFFT section 157 and demodulation section 158) itself of radio reception apparatus 150.

Further, according to the present embodiment, the coefficient W is derived using the function f(W) showing the reception error rate ER predicted when a signal having its transmission power controlled is transmitted to radio reception apparatus 150, so that it is possible to carry out a most suitable transmission power control in consideration of the signal distortions caused by the transmission power control.

In other words, in the present embodiment, the weighting factor W for weighting the transmission power control is searched in accordance with the predictions for the fluctuation of the reception error rate ER. In this way, it is possible to prevent the transmission power from being excessively corrected.

By comparison, in one example of a technology for transmission power control in multicarrier transfer, for instance, the transmission power is controlled in the frequency domain at a level which is always the same as the fluctuations of the propagation path. In other words, maximum ratio transmission is carried out. In this case, the reception power at each frequency on the receiver-side appears as fluctuations of the squares of the fluctuations of the propagation path. This significant increase of power fluctuations in a frequency domain may become, in single carrier transmission, a factor that leads to deteriorated reception error rates. In other words, there may be cases where the deterioration of error rate characteristics caused by transmission power control is greater than the effects of the error rate characteristic improvement by maximum ratio transmission. However, in the present embodiment, by predicting the fluctuations of the error rate characteristic due to the transmission power control, it is possible to derive an optimal weighting factor W that makes the deterioration of error rate characteristic caused by the transmission power control is less than the effects of error rate characteristic improvement, and, as a result, the reception error rate ER of the radio reception apparatus 150 can be reliably improved.

Also, according to the present embodiment, the transmission power can be controlled by using the weighting factor $W_{MIN\_ER}$ that minimizes the predicted reception error rate ER, so that the reception error rate of the radio reception apparatus 150 can be minimized.

Further, according to the present embodiment, an optimal transmission power can be obtained from the weighting factor W that is commonly set between the frequencies included in the single-carrier band, and the propagation path information Hk, so that optimal weighting of the transmission power control is possible.

In this embodiment, as described above, the weighting factor W is set to a common value between frequencies. However, the weighting factor may be set individually for each frequency (i.e., a weighting factor W associated with each frequency may be derived).

Also, in the present embodiment, the weighting factor W is derived by using a function of reception error rate ER. However, the derivation method of the weighting factor W is not limited to the above method, but it may also be a method based on other suitable parameters. Other suitable parameters may include existing or new information to be transmitted from radio reception apparatus 100, or, existing or new information to be measured, calculated or set by radio transmission apparatus 100.

Also, in the present embodiment, FFT processing is adopted for the processing for converting a signal in a time domain to a signal in a frequency domain, and IFFT processing is adopted for the processing for inversely converting the signal in the frequency domain to a signal in a time domain. In addition, applicable conversion processing is not limited to FFT processing alone, but other suitable processing including, for instance, DCT (Discrete Cosine Transform) processing and Wavelet transform processing can also be employed. Also, available inverse conversion processing is not limited to IFFT processing alone, and other suitable processing including, for instance, inverse DCT processing and inverse Wavelet conversion processing can also be employed.

Radio transmission apparatus 100 and radio reception apparatus 150 of the present embodiment can be adopted both in base station apparatuses and mobile station apparatuses for use in mobile communications systems adopting single carrier frequency domain equalization technology.

(Embodiment 2)

Figure 6:
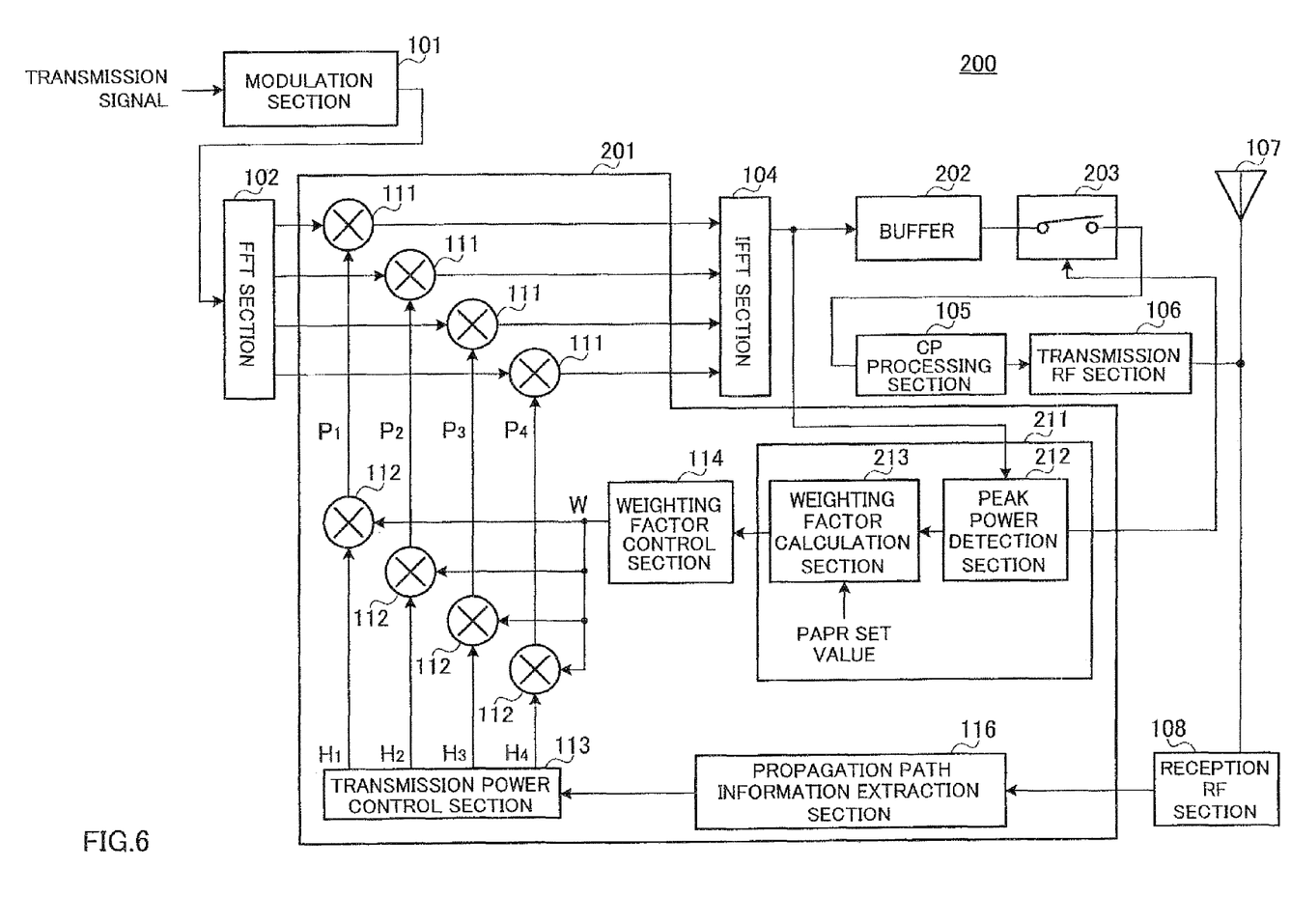
FIG. 6 is a block diagram showing a configuration of a radio transmission apparatus according to embodiment 2 of the present invention.

FIG. 6 is a block diagram showing a configuration of a radio transmission apparatus according to embodiment 2 of the present invention. Radio transmission apparatus 200 of FIG. 6 has the same basic configuration as that of radio transmission apparatus 100 described in embodiment 1, and identical components will be assigned the same reference numerals and detailed descriptions thereof will be omitted. Radio reception apparatus 150 described in embodiment 1 can carry out radio communication with radio transmission apparatus 200.

Radio transmission apparatus 200 adopts a configuration which, in addition to having control section 201 in place of control section 103 described in embodiment 1, also has buffer 202 for temporarily storing transmission signals that have been subjected to IFFT processing, and switching section 203 which is switched on/off in accordance with an inputted instruction signal and outputs the transmission signals stored in buffer 202, to CP processing section 105.

Control section 201 includes multiplication sections 111 and 112, transmission power control section 113, weighting factor control section 114 and propagation path information extraction section 116, which have been described in embodiment 1, and further includes weighting factor deriving section 221 that derives, in accordance with a function g(W) that shows the relationship between a PAPR (Peak-to-Average Power Ratio) of the IFFT-processed transmission signal and the weighting factor W, the maximum value of the weighting factor W that makes the PAPR equal to or lower than a value determined in advance by the setting of the radio section (PAPR set value: 10 dB, for example). Weighting factor deriving section 211 has peak power detection section 212 that detects a peak power of the IFFT-processed transmission signal, weighting factor calculation section 213 that calculates, upon input of a report signal from peak power detection section 212, the weighting factor W for use for transmission power control, in accordance with the above-described PAPR set value.

Next, a description will be given on the transmission power control operation in radio transmission apparatus 200 having the above configuration.

First, in weighting factor calculation section 213, the weighting factor W is temporarily set to the maximum value (i.e., W=1) and then outputted to weighting factor control section 114. Next, the transmission power of the transmission signal is controlled in accordance with the transmission power control operation described in embodiment 1. The transmission signal having its transmission power controlled, is subjected to IFFT processing by IFFT section 104 and then stored in buffer 202. At this time, the peak power of the IFFT-processed transmission signal is detected by peak power detection section 212. Then, peak power detection section 212 calculates the PAPR.

Next, the calculated PAPR is compared to the PAPR set value. If the result of the comparison shows that the PAPR is equal to or lower than the PAPR set value, an instruction signal is inputted from peak power detection section 212 to switching section 203. In this way, switching section 203 is switched to an on-state and the transmission signals stored in buffer 202 are transferred to CP processing section 105. A report signal showing that the PAPR is equal to or lower than the PAPR set value is inputted to weighting factor calculation section 213, and, as a result, the value that was set by weighting factor calculation section 213 is reset to the default value. On the one hand, if the result of the comparison shows that the PAPR exceeds the PAPR set value, an instruction signal that switches switching section 203 to an off-state is inputted from peak power detection section 212 to switching section 203. With this, switching section 203 is switched to an off-state. Also, a report signal showing that the PAPR exceeds the PAPR set value, is inputted to weighting factor calculation section 213.

Next, a value smaller than the value that was temporarily set as a candidate for the weighting factor W for use (denoted by "1" in this description), is calculated by weighting factor calculation section 213, in accordance with the inputted report signal. The calculated value is then outputted to weighting factor control section 114 as the next candidate for the weighting factor for use.

In other words, weighting factor deriving section 211, which includes peak power detection section 212 and weighting factor calculation section 213, calculates the PAPR in association with the candidate for the weighting factor W. If the PAPR calculated in association with a first value set as the candidate is equal to or lower than the PAPR set value, the first value is set as the weighting factor W. On the other hand, if the PAPR calculated in association with the first value is greater than the PAPR set value, a second value, which is smaller than the first value, is temporarily set as a new candidate.

The above-described operation is repeated until the peak power detected by the peak power detection section 212 takes a predetermined value. Accordingly, an optimal weighting factor W can be derived by loop processing. Also, a maximum weighting factor W that makes the peak power a predetermined value can be detected, and the value of the peak power can be controlled. Further, by making the maximum value of the weighting factor W (W=1) the default value of the candidate, it is possible to efficiently derive the optimal weighting factor W by loop processing.

According to the present embodiment, an increase in the PAPR caused by transmission power control can be suppressed, so that the efficiency of the transmission amplifier of the radio section can be improved.

In the present embodiment, the weighting factor W is set to a common value between frequencies. However, the weighting factor may also be set individually for each frequency (in other words, a weighting factor Wk associated with each frequency may be derived).

In the present embodiment, FFT processing is adopted for the processing for converting a signal in a time domain to a signal in a frequency domain, and IFFT processing is adopted for the processing for inversely converting the signal in the frequency domain to the signal in the time domain. In addition, applicable conversion processing is not limited to FFT processing alone, and other suitable processing including, for instance, DCT (Discrete Cosine Transform) processing and Wavelet transform processing can also be employed. Also, available inverse conversion processing is not limited to IFFT processing alone, and other suitable processing including, for instance, inverse DCT processing and inverse Wavelet transform processing can be employed.

Radio transmission apparatus 200 of the present embodiment can be employed both in base station apparatus and mobile station apparatus used in mobile communication systems adopting single carrier frequency domain equalization technology.

Weighting factor deriving section 211, buffer 202 and switching section 203 described in the present embodiment can be combined with the configuration of radio transmission apparatus 100 described in embodiment 1.

There are cases where the base station apparatus in the above-described embodiments is referred to as "Node B," the mobile station apparatus as "UE" and the "subcarrier" as "tone."

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-229733, filed on Aug. 5, 2004, the entire content of which is expressly incorporated by reference herein.

Industrial Applicability

The radio transmission apparatus and the radio transmission method of the present invention are suitable for use in base station apparatuses or in mobile station apparatuses employed in single carrier transmission systems with frequency domain equalization.

The invention claimed is:

1. A radio transmission apparatus comprising:
a conversion section configured to convert a signal in a time domain to signals on a plurality of frequencies in a frequency domain;
a control section configured to control a transmission power, based on a coefficient which is either common among the plurality of frequencies or individual for each of the plurality of frequencies;
an inverse conversion section configured to inversely convert the signals on the plurality of frequencies to a signal in the time domain; and
a transmission section configured to transmit the inversely converted signal with the controlled transmission power.

2. The radio transmission apparatus according to claim 1, wherein the plurality of frequencies forms a single carrier band.

3. The radio transmission, apparatus according to claim 1, wherein the plurality of frequencies corresponds to subcarriers or subbands, into which a band is divided.

4. The radio transmission apparatus according to claim 1, further comprising a reception section configured to receive propagation path information, wherein, said control section controls the transmission power based on the coefficient and the propagation path information.

5. The radio transmission apparatus according to claim 1, wherein said control section controls the transmission power using the coefficient, which is common among the plurality of frequencies, or the coefficient, which is individual for each of the plurality of frequencies based on propagation path information.

6. The radio transmission apparatus according to claim 1, wherein said control section controls the transmission power using the coefficient, which is common among the plurality of frequencies and is set based on propagation path information, or the coefficient, which is individual for each of the plurality of frequencies and is set based on the propagation path information.

7. The radio transmission apparatus according to claim 1, wherein said control section derives the coefficient in accordance with a function that represents a reception error rate predicted when a reception apparatus receives the inversely converted signal with the controlled transmission power.

8. The radio transmission apparatus according to claim 7, wherein said control section obtains the coefficient that minimizes the reception error rate using the function.

9. The radio transmission apparatus according to claim 1, further comprising a reception section configured to receive frequency equalization algorithm information, wherein said control section controls the transmission power based on the frequency equalization algorithm information.

10. A radio reception apparatus comprising:
- a reception section configured to receive a signal in a time domain, to which signals on a plurality of frequencies are converted and which is transmitted with a transmission power that is controlled based on a coefficient which is either common among the plurality of frequencies or individual for each of the plurality of frequencies;
- a convert section configured to convert the received signal to signals on a plurality of frequencies in a frequency domain;
- a frequency equalization section configured to perform a frequency equalization for the converted signals; and
- an inverse conversion section configured to inversely convert the signals for which the frequency equalization is performed to a signal in the time domain.

11. A radio transmission method comprising:
- converting a signal in a time domain to signals on a plurality of frequencies in a frequency domain;
- controlling a transmission power, based on a coefficient which is either common among the plurality of frequencies or individual for each of the plurality of frequencies;
- inversely converting the signals on the plurality of frequencies to a signal in the time domain; and
- transmitting the inversely converted signal with the controlled transmission power.

12. A radio reception method comprising:
- receiving a signal in a time domain, to which signals on a plurality of frequencies are converted and which is transmitted with a transmission power that is controlled based on a coefficient which is either common among the plurality of frequencies or individual for each of the plurality of frequencies;
- converting the received signal to signals on a plurality of frequencies in a frequency domain;
- performing a frequency equalization for the converted signals; and
- inversely converting the signals for which the frequency equalization is performed to a signal in the time domain.

* * * * *